United States Patent
Demaj et al.

(10) Patent No.: US 8,606,313 B2
(45) Date of Patent: Dec. 10, 2013

(54) PROCESS FOR IMPROVING THE DETERMINATION OF THE SIR TARGET IN AN OUTER LOOP POWER CONTROL MECHANISM OF UMTS UE

(75) Inventors: Pierre Demaj, Nice (FR); Fabrizio Tomatis, Saint Laurent du Var (FR)

(73) Assignee: ST-Ericsson SA, Plan-les-Ouates (CH)

(*) Notice: Subject to any disclaimer, the term of this patent is extended or adjusted under 35 U.S.C. 154(b) by 208 days.

(21) Appl. No.: 13/263,068

(22) PCT Filed: Mar. 31, 2010

(86) PCT No.: PCT/EP2010/002056
§ 371 (c)(1),
(2), (4) Date: Nov. 11, 2011

(87) PCT Pub. No.: WO2010/115569
PCT Pub. Date: Oct. 14, 2010

(65) Prior Publication Data
US 2012/0058798 A1 Mar. 8, 2012

(30) Foreign Application Priority Data
Apr. 7, 2009 (FR) .................................. 09 368010

(51) Int. Cl.
*H04B 7/00* (2006.01)
*H04B 17/00* (2006.01)
(52) U.S. Cl.
USPC ....... 455/522; 455/69; 455/67.11; 455/226.1; 375/346
(58) Field of Classification Search
USPC ............... 455/67.11, 67.13, 69, 226.1, 226.3, 455/522; 375/346; 370/252, 333
See application file for complete search history.

(56) References Cited

U.S. PATENT DOCUMENTS

| | | | |
|---|---|---|---|
| 6,622,024 B2 * | 9/2003 | Koo et al. | 455/522 |
| 7,082,317 B2 * | 7/2006 | Yano et al. | 455/522 |
| 7,218,949 B2 * | 5/2007 | Koo et al. | 455/522 |
| 7,423,976 B2 * | 9/2008 | Wang et al. | 370/252 |

FOREIGN PATENT DOCUMENTS

| | | |
|---|---|---|
| EP | 1926225 A1 | 5/2008 |
| GB | 2452813 A | 3/2009 |
| WO | 2008115700 A1 | 9/2008 |

OTHER PUBLICATIONS

Patent Cooperation Treaty International Search Report and Written Opinion for PCT/EP2010/002056; Jun. 8, 2010; 9 pages.
"On Setting Reverse Link Target SIR in a CDMA System", A. Sampath, P.S. Kumar, J.M. Holzman in proc. of IEEE 47th Vehicular Technology Conference, 1997; 5 pages.

(Continued)

*Primary Examiner* — Quochien B Vuong
(74) *Attorney, Agent, or Firm* — Howison & Arnott, L.L.P.

(57) ABSTRACT

In a receiver of a UMTS telecommunication system a process for performing the Outer Loop power control in a User Equipment is provided. The receiver includes an improved outer loop power control mechanism that estimates a Signal to Interference target ($SIR_{targ}$) based on a Block Error Rate target ($BLER_{targ}$) received from a base station. The outer loop control mechanism estimates a BLER value ($BLER_{est}$) based on a number of received blocks and then adjusts a SIR target value ($SIR_{targ}$) based on the relationship between $BLER_{targ}$ and $BLER_{est}$. Meanwhile, simultaneously in parallel, the outer loop power control mechanism monitors for a potential convergence of a first SIR value with the $SIR_{targ}$ and upon detection of such potential convergence applying a correction to $SIR_{targ}$.

9 Claims, 5 Drawing Sheets (56) References Cited

OTHER PUBLICATIONS

ETSI; 3GPP specification 25.211; Universal Mobile Telecommunications System (UMTS); Physical channels and mapping of transport channels onto physical channels (FDD); 3GPP TS 25.211 version 9.2.0 Release 9; 60 pages; Oct. 2010.

ETSI; 3GPP specification 25.212; Universal Mobile Telecommunications System (UMTS); Multiplexing and channel coding (FDD); 3GPP TS 25.212 version 9.4.0 Release 9; 110 pages; Jan. 2011.

ETSI; 3GPP specification 25.213; Universal Mobile Telecommunications System (UMTS); Spreading and Modulation (FDD); 3GPP TS 25.213 version 9.2.0 Release 9; 40 pages; Oct. 2010.

ETSI; 3GPP specification 25.214; Universal Mobile Telecommunications System (UMTS); Physical layer procedures (FDD); 3GPP TS 25.214 version 9.6.0 Release 9; 101 pages; Jul. 2011.

Patent Cooperation Treaty International Preliminary Report on Patentability for PCT/EP2010/002056; Oct. 20, 2011; 6 pages.

* cited by examiner

PROCESS FOR IMPROVING THE DETERMINATION OF THE SIR TARGET IN AN OUTER LOOP POWER CONTROL MECHANISM OF UMTS UE

CROSS-REFERENCE TO RELATED APPLICATIONS

This application is a U.S. National Phase application submitted under 35 U.S.C. §371 of Patent Cooperation Treaty application serial no. PCT/EP2010/002056, filed Mar. 31, 2010, and entitled PROCESS FOR IMPROVING THE DETERMINATION OF THE SIR TARGET IN A OUTER LOOP POWER CONTROL MECHANISM OF UMTS EU, which application claims priority to European patent application serial no. EP 09368010.6, filed Apr. 7, 2009, and entitled PROCESS FOR IMPROVING THE DETERMINATION OF THE SIR TARGET IN A OUTPUTER LOOP POWER CONTROL MECHANISM OF UMTS UE.

Patent Cooperation Treaty application serial no. PCT/EP2010/002056, published as WO 2010/115569, and European patent application serial no. EP 09368010.6, are incorporated herein by reference.

TECHNICAL FIELD

The invention relates to the field of wireless communication and more particularly to a process for improving the determination of the SIR target in an outer loop power control mechanism of a UMTS User Equipment.

BACKGROUND

The UMTS standard specifies a particular power loop control mechanism for adjusting the power transmitted both by the base station to the mobile user (User Equipment UE)—in the case of the downlink—as well as the power transmitted by the latter to the Base station in the case of the uplink. See in particular 3GPP specification 25.211, 25.212, 25.213, 25.214.

The power control is divided into two parts, fast power control also called inner loop control and outer loop control. The fast power control is used to counteract the effects of fast fading by adjusting the transmitting power of the mobiles in order to achieve a given Signal to Interference Ratio (SIR) target.

Outer loop power control is not specified in 3GPP and is used to maintain a certain quality in terms of Block Error Rate (BLER). This is done by comparing a measure BLER value with a BLERtarget and using the difference to regulate the SIRtarget used by the fast power control.

Figure 1:
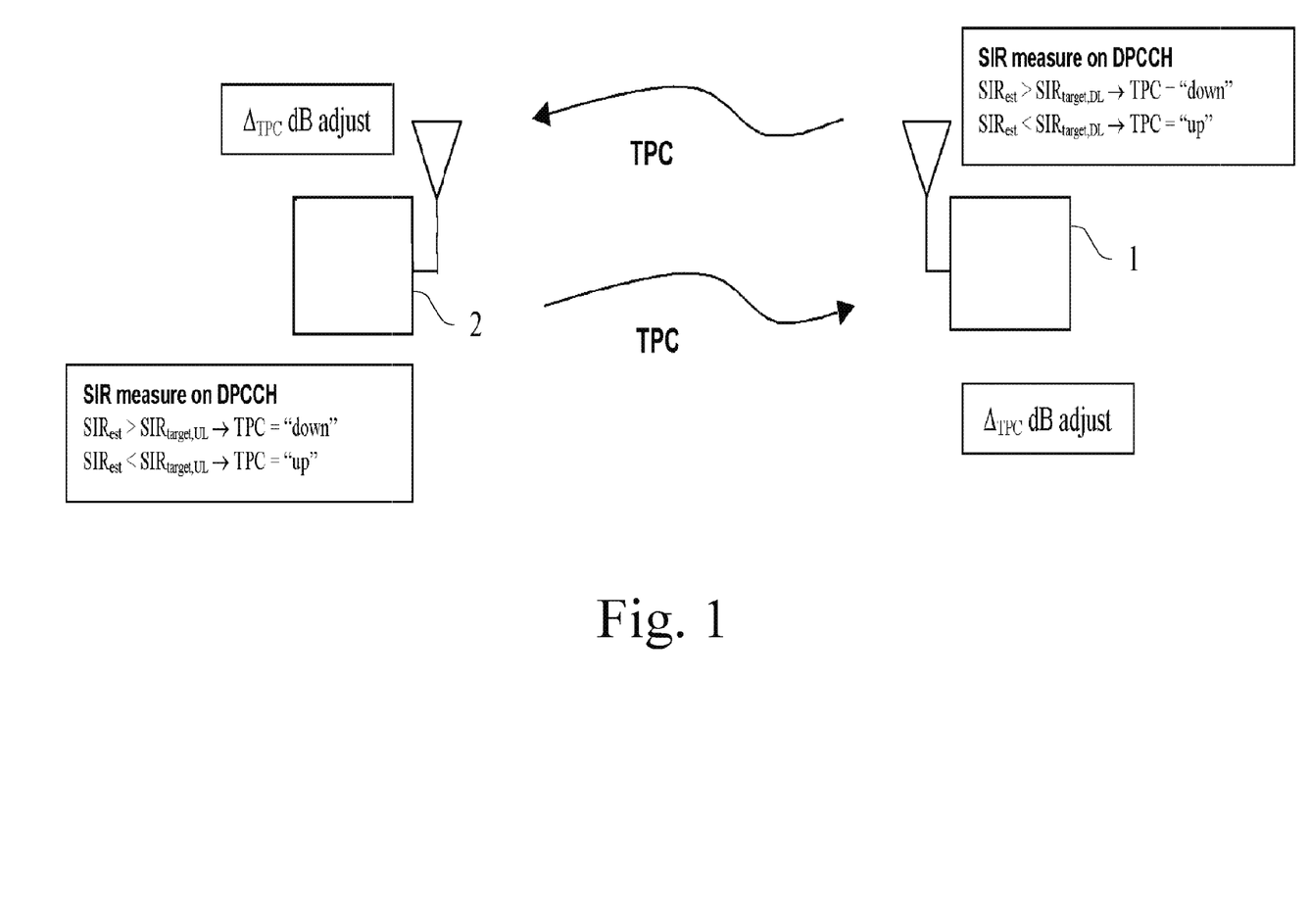
FIG. 1 illustrates the general principle of the inner and outer power control loops used in both the downlink and uplink level.

Those two mechanisms, the former Outer Loop Power Control and a latter Inner Loop Power control mechanism, are illustrated in FIG. 1 showing UE 1 and base station 2 regulating the power of the communication by means of Transmit Power Control (TPC) commands received in the uplink and the downlink for keeping the received uplink Signal-to-Interference Ratio (SIR) at a given SIR target. The base station transmitter is capable of changing the output power in the slot immediately after the TPC_cmd can be derived.

With respect to FIG. 1, one should take note of the fact that SIRest is equal to the averaged SIR estimation and SIR target is equal to the value of SIR which is needed to get the required BLER target. DeltaTPC adjust is the power offset in dB that can be applied from one slot to the next to the dedicated channel.

The outer loop adjustment—which is the object of the present invention—is an internal process performed by the UE adapting the SIR Target in order to reach the quality of service set by the network with the aim of maintaining constant the level of the BLER even with a changing environment. To achieve this, the UE estimates the BLER from the number of CRC (Code Redundancy Check) attached to the transmitted data. Checking the CRC the UE can detect if a transmitted block is corrupted or not.

Typical values for the BLER Target are 0.1, 0.01, 0.001, for connection with high quality of service a BLER target of $10^{-4}$, would be required.

More information relating to this procedure can be found in the following reference documents:

"On setting reverse link target SIR in a CDMA system", A. Sampath, P. S. Kumar, J. M. Holzman in proc. of IEEE 47th Vehicular Technology Conference, 1997.

Outer loop power control techniques which are known in the art show a significant drawback resulting in the great number of blocks or frames which need to be processed before issuing any feedback value regarding the actual SIR characterizing the wireless communication. For instance, a BLER target equal to $10^{-3}$ requires in practice several thousands of blocks to achieve minimum accuracy.

Clearly, such known outer loop power control techniques are inappropriate for a number of situations where the environment is rapidly changing, including the following cases:

the moving of the User Equipment and, correspondingly, an environment switching from a static environment to a Fading environment;

an ideal Line Of Sight communication might suddenly disappear and be replaced by a strongly attenuated multipath wireless communication;

the UE receives multi-TrChs (Transport Channels), for instance 1 Turbo and 1 Viterbi, and the base station decides to switch from the turbo decoding to a viterbi decoding thus resulting in a decrease in the efficiency of the error correcting process. In practice, one notes that a SIR Target for Turbo can be 2 dBs smaller than SIR Target Viterbi for same BLER Target.

UE receives multi-TrChs with different BLER target, the TrCh with the bigger BLER target is continuously received while the other is not. As soon as the TrCh with smaller BLER target is transmitted again the performance of such are severely degraded.

In these circumstances, the quality of service is exposed to sudden deterioration, requiring a prompt increase of the SIR target by the outer loop control so as to avoid serious communication problems or, even, the loss of the connection (Call drop).

Known outer loop power control techniques, because they exclusively are based on the BLER, are incapable of providing fast adaptation to such changing environment.

Thus, there is therefore a desire to improve the situation.

SUMMARY

Embodiments of the present invention provide an outer loop power control mechanism which does not exclusively monitor the sole BLER value fixed by the base station.

Embodiments of the present invention provide an improved outer loop power control which is able to detect prompt changes in the condition of a UMTS wireless communication, and particularly to adapt to a quick change in the quality of service of the communication.

Embodiments of the present invention provide a process which advantageously combines the prior art mechanism based on the BLER with a new mechanism providing quickly reacting monitoring of changes of conditions of the wireless communication.

Additional embodiments of the present invention provide a process which does not require as much time as the known prior art mechanism to report a quick change in the conditions of the wireless communications.

These and other advantages of the invention embodiments are achieved by means of an outer loop power control mechanism comprising the following steps:
applying a first estimation of the Signal To Interference (SIR) target in accordance with the value of the Block Error Rate (BLER) target received from the base station comprising the steps of:

receiving the BLER target ($BLER_{targ}$) from the base station;

performing an estimation of the value ($BLER_{est}$) of the BLER value on a number of N1 blocks;

comparing said estimation ($BLER_{est}$) to the value of the BLER target ($BLER_{targ}$) and in response to said comparison, increasing said SIR target ($SIR_{targ}$) if $BLER_{est}$>$BLER_{targ}$ and decreasing said SIR target ($SIR_{targ}$).

An exemplary process may further comprise an additional algorithm being executed in parallel for providing quick corrections to the value of said SIR target ($SIR_{targ}$).

That additional algorithm comprises the steps of:
computing an estimation of the SIR value;
counting the number of CRC errors occurring during a predefined sliding window;
detecting a double condition comprising:
the detection of a burst of CRC errors occurring during said predefined sliding window;
pre-convergence of said first estimation of SIR target, said pre-convergence consisting in the fact that the estimated of the SIR value is close to the SIR target value issued by said first estimation;
And, further to said detection, applying (24) an immediate correction to said SIR target $SIR_{targ}$.

Therefore, since the monitoring of the change of conditions of the telecommunication reception is not based on the sole BLER, as in the prior art systems, but on the detection of a burst of CRC during a predefined windows corresponding to a few slots, the system becomes now able to detect quick changes in the quality of service of the communication.

In one embodiment, the estimation of the SIR is performed on the basis of the use of predicative pilot occurring on downlink channels.

The predefined window is fixed to correspond to a number of N TTI (Transport Time Interval), but does not include empty TTI comprising no blocks.

The invention also provides a receiver for a UMTS communication system comprising an improved outer loop power control mechanism comprising:
means for applying a first estimation of the Signal To Interference (SIR) target in accordance with the value of the Block Error Rate (BLER) target received from the base station further comprising:

means for receiving the BLER target ($BLER_{targ}$) from the base station;

means for performing an estimation of the value ($BLER_{est}$) of the BLER value on a number of N1 blocks;

means for comparing said estimation ($BLER_{est}$) to the value of the BLER target ($BLER_{targ}$) and in response to said comparison, increasing said SIR target ($SIR_{targ}$) if $BLER_{est}$>$BLER_{targ}$ and, conversely, decreasing said SIR target.

An exemplary receiver may further include:
means for performing an additional process performed in parallel to said estimation for correcting the value of said SIR target ($SIR_{targ}$) issued by the latter, comprising:
means for computing an estimation of the SIR value;
means for counting the number of CRC errors occurring during a predefined sliding window;
means for detecting a double condition comprising:
the detection of a burst of CRC errors occurring during said predefined sliding window;
pre-convergence of said first estimation of SIR target, said pre-convergence consisting in the fact that the estimated of the SIR value is close to the SIR target value issued by said first estimation;
And, further to said detection, further comprising means for applying (24) an immediate correction to said SIR target $SIR_{targ}$.

Embodiments of the invention may be particularly adapted to a UMTS mobile telephone or User Equipment.

BRIEF DESCRIPTION OF THE DRAWINGS

Other features of one or more embodiments of the invention will best be understood by reference to the following detailed description when read in conjunction with the accompanying drawings.

DETAILED DESCRIPTION

Figure 2A:
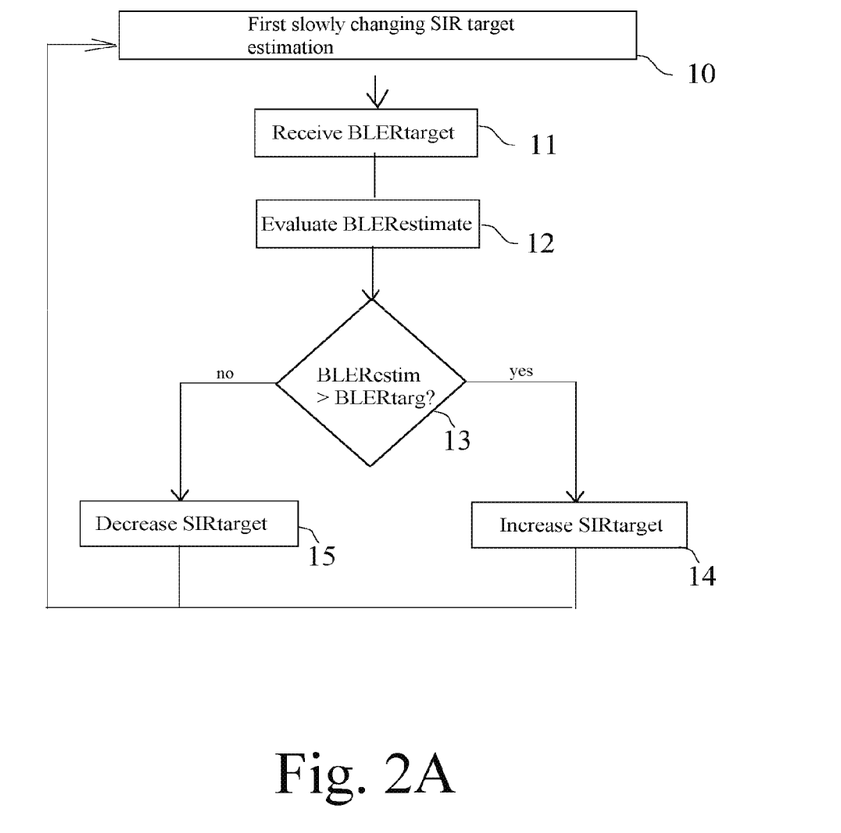
FIGS. 2A and 2B describe one embodiment which comprises two processes being executed in parallel.
Figure 2B:
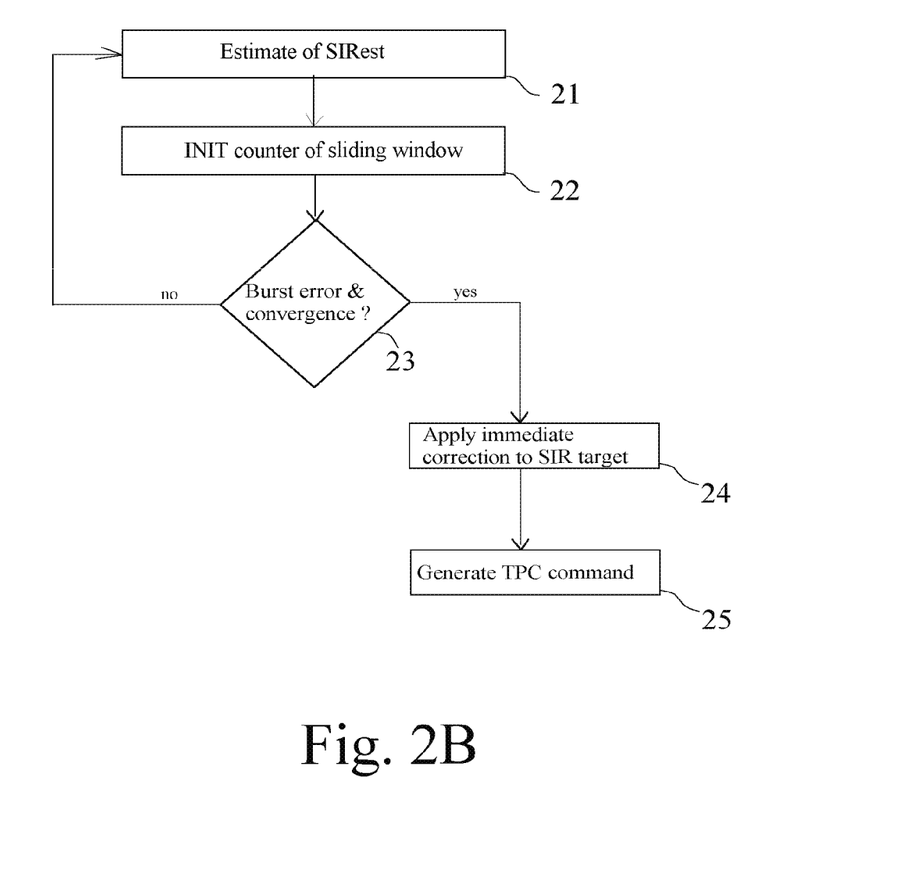

With respect to FIGS. 2A and 2B, there is now described one embodiment which comprises two processes being executed in parallel.

The first process, illustrated in step 10-15, is used for generating a first evaluation of the SIR Target and may advantageously use any known technique.

In the embodiment of FIG. 2A, it can be seen that, in a step 10, the process applies a first estimation of the SIR target ($SIR_{targ}$) in accordance with the BLER target ($BLER_{targ}$) received from the base station. Such first estimation is based on the known technique comprising steps 11-13 as follows:

In a step 11, the process receives the BLER target ($BLER_{targ}$) from the base station.

In a step 12, the process performs BLER estimate ($BLER_{est}$) of the BLER value on a number of N1 blocks, with N1 dependent on the value of BLER target. For instance, if BLER target is equal to $10^{-3}$, the value of N1 may be equal to 1000 blocks.

In a step 13, the process compares the value of $BLER_{est}$ to the target $BLER_{targ}$. If $BLER_{est}$>$BLER_{targ}$ then the process increases, in a step 14, the SIR Target ($SIR_{targ}$) of a first predefined value (X) and, otherwise decreases, in a step 15, the value of $SIR_{targ}$ of a second predefined value (Y).

One may see that the process of steps 10-15 continuously update the value of the SIR target in a slow convergence process that is perfectly adapted to the value of BLER target with a presumably static channel.

FIG. 2B shows an additional second branch, executed in parallel with the steps 11-15 above, which allows a fine correction of the SIR target in the case of sudden changes in the environment.

FIG. 2B starts with a step 21, wherein the process proceeds with an estimation of the signal to noise ratio, including the effect of the interference plus noise. The computation of a signal to noise ratio is an operation which is well known to the skilled man and will not be elaborated further on. It suffices to say that such estimation is based on the use of some predictive pilots on some downlink channels. In particular, in one embodiment, a measurement of the SIR is performed in every slot that achieves 15 measurements per frame for each channel.

Step 22 is an initialization step of a CRC counter that is intended to count the number of CRC errors, which are detected within a sliding window of a few TTIs (Transmit Time Interval).

It should be noticed, and this is an advantageous aspect of the embodiment, that the sliding window is arranged to detect a burst of CRC errors occurring during a limited period of a few frames, thus allowing quick adaptation of the exemplary process.

Step 23 is a test to detect a double condition which is:

firstly the detection of a burst of CRC errors during the predefined sliding windows;

secondly, and this is another important feature of the invention, in order to ascertain the stability of the whole algorithm, the pre-convergence of the process (of steps 10-15), that is, the $SIR_{est}$ of step 21 is close to the first evaluation of the SIR Target computed in steps 10-15. Particularly, convergence is being decided when the difference between $SIR_{est}$ and the first estimation of $SIR_{targ}$ is less than a predefined difference.

If the double condition is not satisfied the process goes back to step 21.

If the double condition is satisfied, then the process proceeds with a step 24, which is the application of an immediate correction to the value of $SIR_{targ}$ that was issued by the basic mechanism of steps 10-15.

In a step 25, the process generates the appropriate Transmit Power Control (TPC) command.

Figure 3:
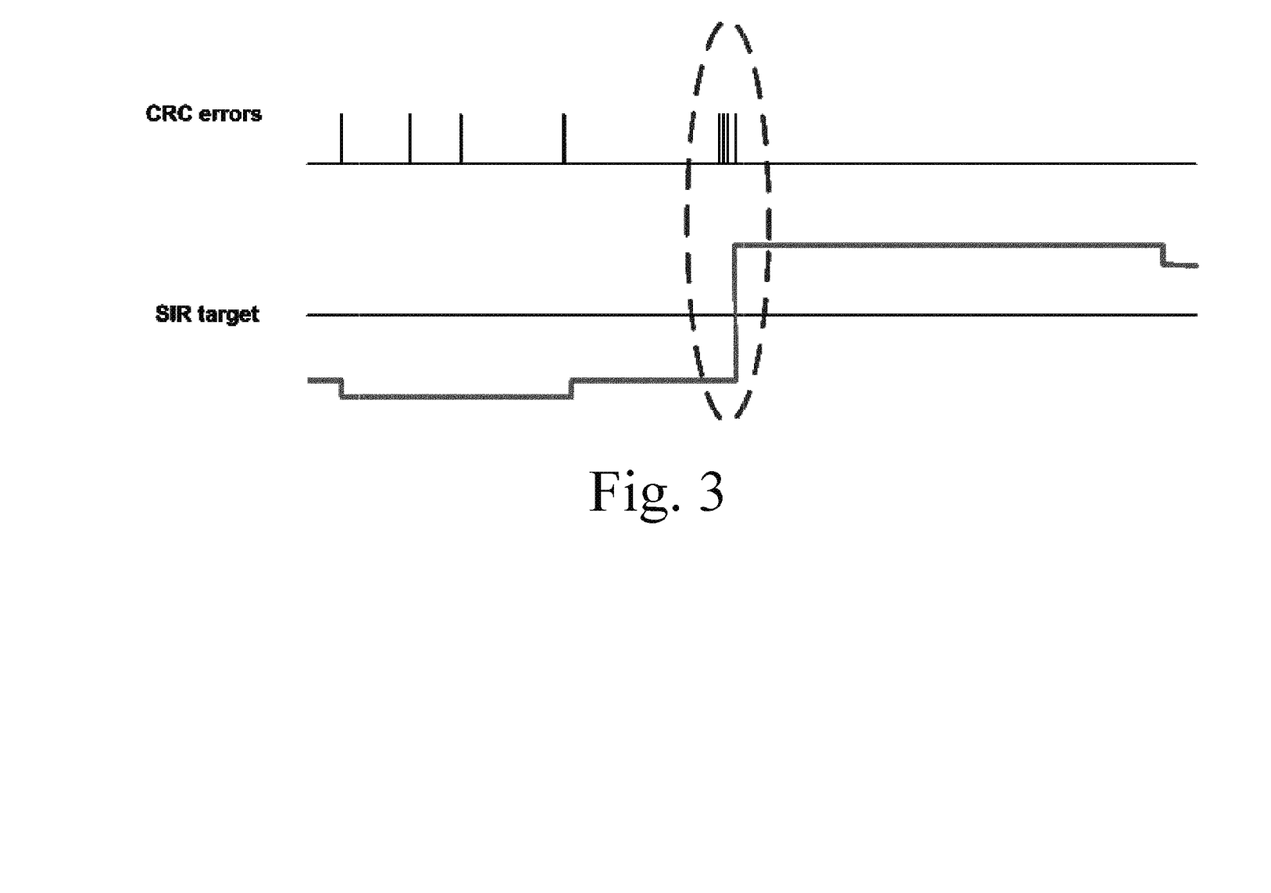
FIG. 3 illustrates a burst error detection principle used in the process of FIG. 2.
Figure 4:
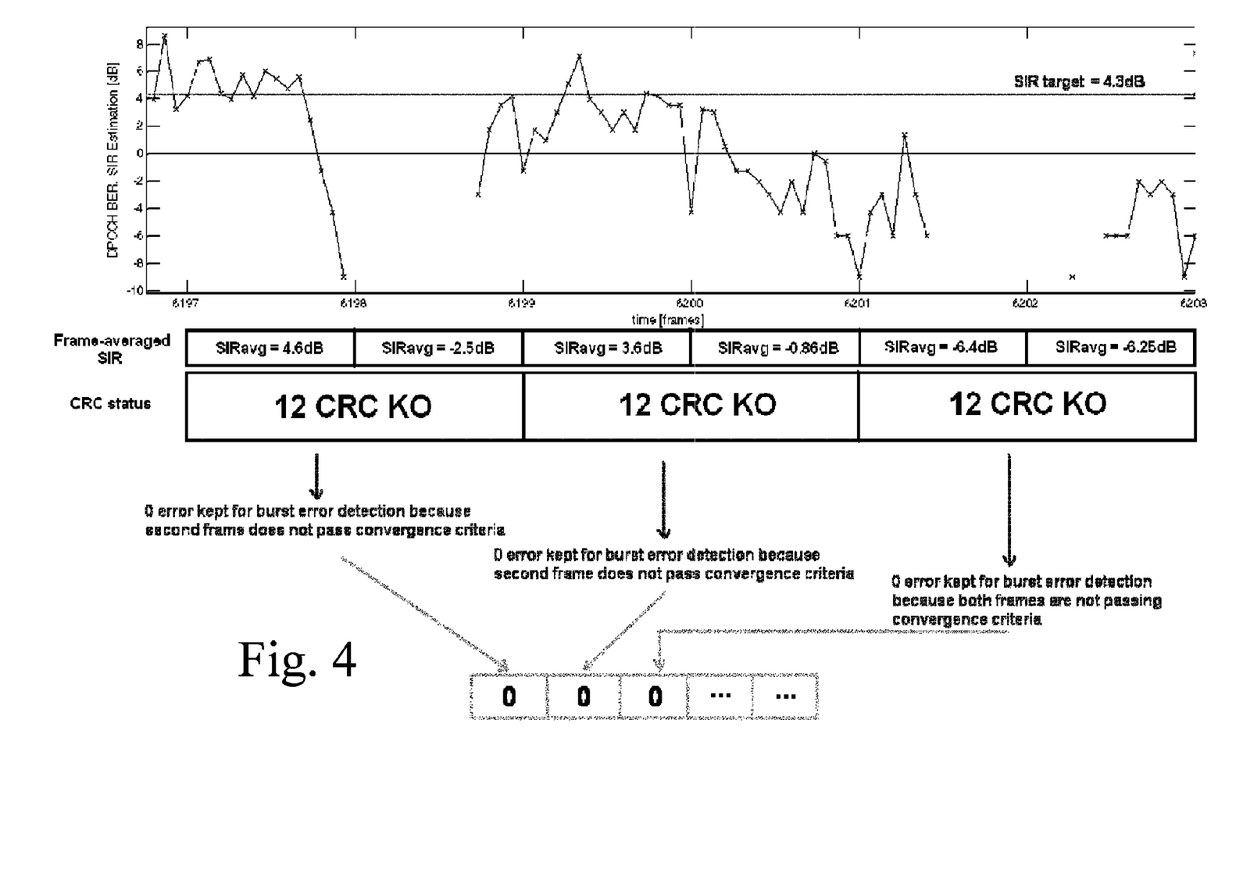
FIG. 4 illustrates an example of the application of the process of the invention.

FIG. 3 shows the illustration of the burst detection in accordance with the embodiment described above.

The process is embodied with the following definitions and variables:

N is the number of TTIs (Time per TrCH X) used for measuring the number of errors NbCRC_X with a sliding window mechanism. Note that, in one particular embodiment, N includes only non-empty TTIs for which a measure is available. N should be small enough to allow a fast reaction to the burst errors and large enough to allow a consistent measurement.

Nthr_X is the number of errors to validate the burst detection condition for a given BLERtgt_X. Nthr_X is function of the BLER target: as a general rule, assuming a smaller BLER target then the number of errors required should be smaller. A CRC KO is to be taken into account for burst error detection if the SIR measured on the corresponding frames of the TTI is such that all frame-averaged SIR are greater than current SIR target—ThSIRburstError. Conversely, if there is at least one frame-averaged SIR (corresponding to the TTI for which CRC KO are reported) lower than current SIR target—ThSIRburstError then the CRC KO detected in this TTI are not taken into account for burst error detection.

ErrorStepUP_X is the SIR target step up value corresponding to the burst detection condition for a BLERtgt_X. ErrorStepUP_X is function of the BLER target and of the number of errors detected on a measurement window. As a rule, ErrorStepUP_X increases for a smaller BLER target and an increasing number of errors.

Constants Definition Examples:

N=5 TTI_X
Nthr_X=4 (number of errors to validate the burst detection condition for a BLERtgt_X in the interval [10e-1.3, 10e-2.3])
Nthr_X=3 (number of errors to validate the burst detection condition for a BLERtgt_X smaller than 10e-2.3)
ThSIRburstError=5 dB.
ErrorStepUP_X=2 dB (SIR target step up value corresponding to the burst detection condition for a BLERtgt_X in the interval [10e-1.3, 10e-2.3])
ErrorStepUP_X=3 dB (SIR target step up value corresponding to the burst detection condition for a BLERtgt_X smaller than 10e-2.3)
Re-initialization
NbCRC_X for every TrCh X=0
Sliding window contents reset (0 measurements in the window)

The invention claimed is:

1. A process for performing an Outer Loop power control in an User Equipment for a UMTS telecommunication system comprising a first process of:
   applying a first estimation of the Signal to Interference (SIR) target ($SIR_{targ}$) in accordance with a value of a Block Error Rate (BLER) target received from a base station comprising:
      receiving the BLER target ($BLER_{targ}$) from the base station;
      performing an estimation of the BLER value ($BLER_{est}$) on a number of N1 blocks;
      comparing the $BLER_{est}$ to the value of the $BLER_{targ}$ and in response to the comparison, increasing said $SIR_{targ}$ when $BLER_{est} > BLER_{targ}$ and decreasing the $SIR_{targ}$ when $BLER_{est} < BLER_{targ}$; and
   a second process in parallel with the first process, the second process comprising:
      correcting the value of the $SIR_{targ}$ issued by the first process, comprising of the steps of:
         computing an estimation of the SIR value;
         counting a number of CRC errors occurring during a predefined sliding window;
         detecting a double condition comprising:
            detecting a burst of CRC errors occurring during the predefined sliding window;
            monitoring for a pre-convergence of the first estimation of the $SIR_{targ}$, said pre-convergence being when estimation of the SIR value is substantially close to the $SIR_{targ}$ value issued by said first estimation of the $SIR_{targ}$; and
         applying an immediate correction to said $SIR_{targ}$.

2. The process according to claim 1, wherein the estimation of the SIR value is performed using a predicative pilot occurring on downlink channels.

3. The process according to claim 1, wherein the predefined window is fixed to correspond to a number of N TTIs (Transport Time Intervals).

4. The process according to claim 3, wherein the sliding window does not include an empty TTI.

5. A receiver for an UMTS telecommunication system comprising an outer loop power control mechanism adapted to:
   apply a first estimation of a Signal To Interference ($SIR_{targ}$) in accordance with the value of a Block Error Rate target ($BLER_{targ}$) received from a base station;
   receive the $BLER_{targ}$ from the base station;

perform an estimation of the BLER value ($BLER_{est}$) on a number of N1 blocks;

compare the $BLER_{est}$ to the $BLER_{targ}$ and increase the $SIR_{targ}$ when $BLER_{est} > BLER_{targ}$ and decrease the $SIR_{targ}$ when the $BLER_{est} < BLER_{targ}$;

the outer loop control mechanism adapted to simultaneously:

compute an estimation of the SIR value;

count a number of CRC errors occurring during a predefined sliding window;

detect a double condition comprising:

a burst of CRC errors occurring during the predefined sliding window;

monitor for a pre-convergence of the first estimation of $SIR_{targ}$ with the estimation of the SIR value; and apply an immediate correction to $SIR_{targ}$.

6. The receiver according to claim 5, wherein the outer loop control mechanism is further adapted to estimate the SIR value based on a predicative pilot received on a downlink channel.

7. The receiver according to claim 5, wherein the predefined sliding window is fixed to correspond to a number of N TTIs (Transport Time Intervals).

8. The receiver according to claim 7, wherein the predefined sliding window does not include an empty TTI.

9. A mobile communication device for a UMTS communication system comprising the receiver of claim 5.

\* \* \* \* \*